US012574381B2

(12) United States Patent

Comeras et al.

(10) Patent No.: US 12,574,381 B2

(45) Date of Patent: Mar. 10, 2026

(54) SCALABLE SOURCE SECURITY GROUP TAG (SGT) PROPAGATION OVER THIRD-PARTY WAN NETWORKS

(71) Applicant: Cisco Technology, Inc., San Jose, CA (US)

(72) Inventors: Marc Portoles Comeras, Mountain View, CA (US); Sanjay Kumar Hooda, Pleasanton, CA (US); Balaji Pitta Venkatachalapathy, San Ramon, CA (US); Kedar Sudhir Karmarkar, San Jose, CA (US); Prakash C. Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 18/223,344

(22) Filed: Jul. 18, 2023

(65) Prior Publication Data

US 2024/0406183 A1 Dec. 5, 2024

Related U.S. Application Data

(60) Provisional application No. 63/470,525, filed on Jun. 2, 2023.

(51) Int. Cl.
*H04L 9/40* (2022.01)
*H04L 45/02* (2022.01)
*H04L 45/745* (2022.01)

(52) U.S. Cl.
CPC ............ *H04L 63/104* (2013.01); *H04L 45/04* (2013.01); *H04L 45/745* (2013.01)

(58) Field of Classification Search
None
See application file for complete search history.

(56) References Cited

U.S. PATENT DOCUMENTS

2010/0309907 A1 12/2010 Proulx et al.
2016/0119837 A1 4/2016 Wang et al.
(Continued)

FOREIGN PATENT DOCUMENTS

AU 2019388833 A1 6/2021

OTHER PUBLICATIONS

Jordi Paillisse et al., "SD-access: practical experiences in designing and deploying software defined enterprise networks" at CoNEXT '20: Proceedings of the 16th International Conference on emerging Networking EXperiments and Technologies pp. 496-508; Nov. 24, 2020 (Year: 2020).*

(Continued)

*Primary Examiner* — Xavier S Wong

(74) *Attorney, Agent, or Firm* — Lee & Hayes, P.C.

(57) ABSTRACT

Techniques for propagating security group tag mapping between external interconnected sites that are not capable of carrying the SGT mappings. A system is disclosed that includes operations of subscribing at a first border of a first site, by a control plane, a first SGT mapping associated with a first data packet at the first site for storing the SGT mapping of the first data packet at the control plane. Then transmitting, the first data packet from the first border of the first site to a second border of the second site without attaching the first SGT mapping with the first data packet. Further, in response to a determination by the control plane that the first data packet has lost the associated first SGT mapping at the second border, identifying the SGT mapping with the first data packet at the second border to be re-associated with the first data packet.

20 Claims, 11 Drawing Sheets

(56)                    References Cited

U.S. PATENT DOCUMENTS

| | | | | |
|---|---|---|---|---|
| 2020/0195616 | A1* | 6/2020 | Edgar | ..................... G06F 21/31 |
| 2021/0075767 | A1* | 3/2021 | Jain | ................... H04W 36/0044 |
| 2021/0352109 | A1* | 11/2021 | Hughes | ............... H04L 63/0245 |
| 2022/0046061 | A1 | 2/2022 | Janakiraman et al. | |
| 2022/0239559 | A1 | 7/2022 | Janakiraman et al. | |
| 2022/0360528 | A1 | 11/2022 | Jain et al. | |
| 2022/0417287 | A1 | 12/2022 | Joshi et al. | |

OTHER PUBLICATIONS

Paillisse J., et al., "SD-Access: Practical Experiences in Designing and Deploying Software Defined Enterprise Networks", CoNEXT '20, Proceedings of the IEEE/ACM 42nd International Conference on Software Engineering Workshops, ACMPUB27, New York, NY, USA, Nov. 23, 2020, pp. 496-508, Dec. 1-4, 2020, XP058729826, DOI: 10.1145/3386367.3431288, ISBN: 978-1-4503-7964-9, p. 499-p. 499.
International Search Report and Written Opinion for International Application No. PCT/US2024/031917, mailed Aug. 26, 2024, 16 Pages.

* cited by examiner

SGT is Lost on WAN:
- No SGT Known for Inter-site Traffic
- Challange to Apply Policies at Destination SGT is Lost on WAN:
- No SGT Handoff
- No SDA (or any other) Overlay Allowed

102(2)

104(2)

HQ Site

IP-SGT2

110(2)

116

Third Party
WAN/IP/MPLS Transit

110(1)

SDA Site

102(1)

104(1)

IP-SGT1

100

(A) Discovery & Policy Service Control Plane Population (B) Distribution (on-demand Learning on Ingress Borders)

(C) Updates (Subscriptions and Usage Tracking on Ingress Border)

500

(A) Discovery

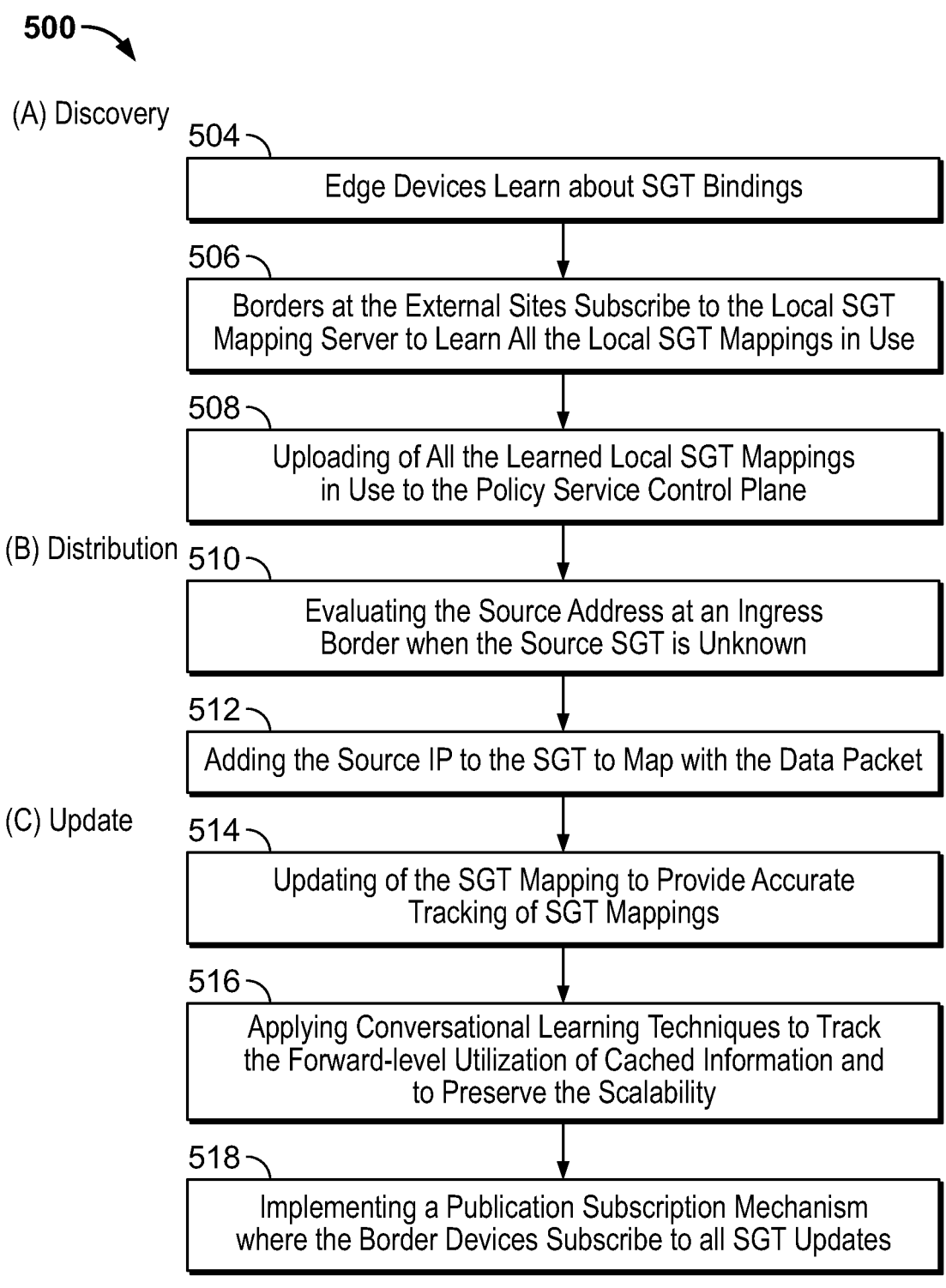

504
Edge Devices Learn about SGT Bindings

506
Borders at the External Sites Subscribe to the Local SGT Mapping Server to Learn All the Local SGT Mappings in Use 508
Uploading of All the Learned Local SGT Mappings in Use to the Policy Service Control Plane (B) Distribution 510
Evaluating the Source Address at an Ingress Border when the Source SGT is Unknown 512
Adding the Source IP to the SGT to Map with the Data Packet (C) Update 514
Updating of the SGT Mapping to Provide Accurate Tracking of SGT Mappings 516
Applying Conversational Learning Techniques to Track the Forward-level Utilization of Cached Information and to Preserve the Scalability 518
Implementing a Publication Subscription Mechanism where the Border Devices Subscribe to all SGT Updates

FIG. 5

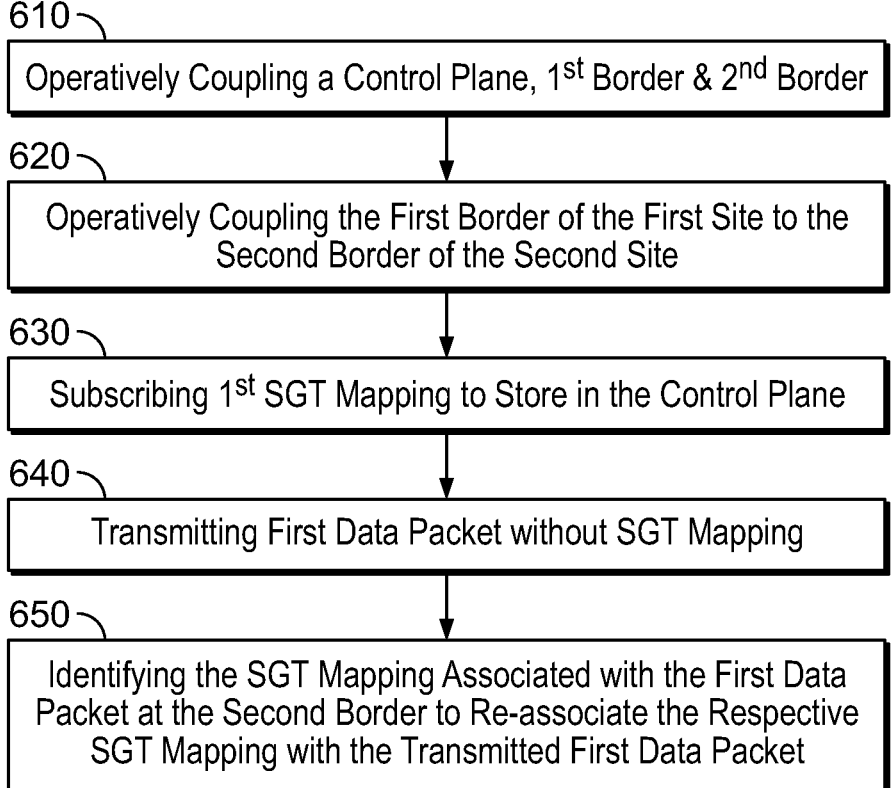

610
Operatively Coupling a Control Plane, 1st Border & 2nd Border

620
Operatively Coupling the First Border of the First Site to the Second Border of the Second Site 630
Subscribing 1st SGT Mapping to Store in the Control Plane 640
Transmitting First Data Packet without SGT Mapping 650
Identifying the SGT Mapping Associated with the First Data Packet at the Second Border to Re-associate the Respective SGT Mapping with the Transmitted First Data Packet

FIG. 6

SCALABLE SOURCE SECURITY GROUP TAG (SGT) PROPAGATION OVER THIRD-PARTY WAN NETWORKS

CROSS-REFERENCE TO RELATED APPLICATIONS

This application claims priority to U.S. Provisional Patent Application No. 63/470,525, filed Jun. 2, 2023, the entire contents of which are incorporated herein by reference.

TECHNICAL FIELD

The present disclosure relates generally to the end-to-end enforcement of Security Group Tag (SGT) over non-SGT-capable network media.

BACKGROUND

The communication of security group information across a network can be implemented in several ways. In network fabrics, security group tags can be used for segmentation and security policy enforcement to allow or deny access to different services, as well as to allow or deny communication across different groups. For traffic that is being sent to local, fabric destinations, as well as for traffic being sent to external destinations, it can be preferable to make classification and policy decisions at the ingress fabric edge as soon as traffic enters the network fabric. This can help avoid and decrease the chances of traffic leakage, security breaches, or attacks.

For example, the information can be distributed as a source group tag (a tag indicating the group to which the source belongs) that is inserted into or associated with a packet in some manner and is communicated across the network. The tag is referred to as the Source Group Tag (SGT) and the SGT which is received in a packet from a trusted interface is propagated throughout the network. The SGT is also used for identity firewall classification. At the egress edge of the network, the group assigned to the packet's destination can be determined by the SGT in the packet. In an implementation, the scalability of a group-based policy application in modern virtualized networks relies on carrying or communicating source group tags from a network fabric ingress to a network fabric egress and applying policies at the egress point. With this type of group-based policy process, the number of group-based policies that each switch is required to hold may have to be limited; hence, by using the SGT, the SGT can enable more scaling of the number of group-based policies during large network deployments.

An exemplary deployment model may be configured with multiple virtualized sites that are interconnected using third-party providers (MPLS, SDWAN, or other WAN transits) which are not able to carry or are explicitly prevented from carrying group tags with traffic. In such cases, group-based policies cannot be used solely at external egress locations of a fabric network and the network administrator may be constrained or forced to select intermediate vantage points of policy applications in a deployment that can result in compromising the scalability of the network devices in a system.

It is desirable to implement a model with SGT end-to-end enforcement over non-SGT-capable network media to distributed sites with techniques including a publication subscription mechanism where border subscribers at the distributed sites can receive updates for policy service that is at least both scalable and meets optimum performance requirements.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method of the discovery, distribution, and update parts of an SGT mappings system for traffic between external sites that are not capable of carrying SGT mappings for enforcing policies in the network shown in FIG. 2.

FIG. 6 illustrates a flow diagram of an example method for enforcing policies by SGT propagation in the network shown in FIG. 2.

DESCRIPTION OF EXAMPLE EMBODIMENTS

Overview

Figure 1:
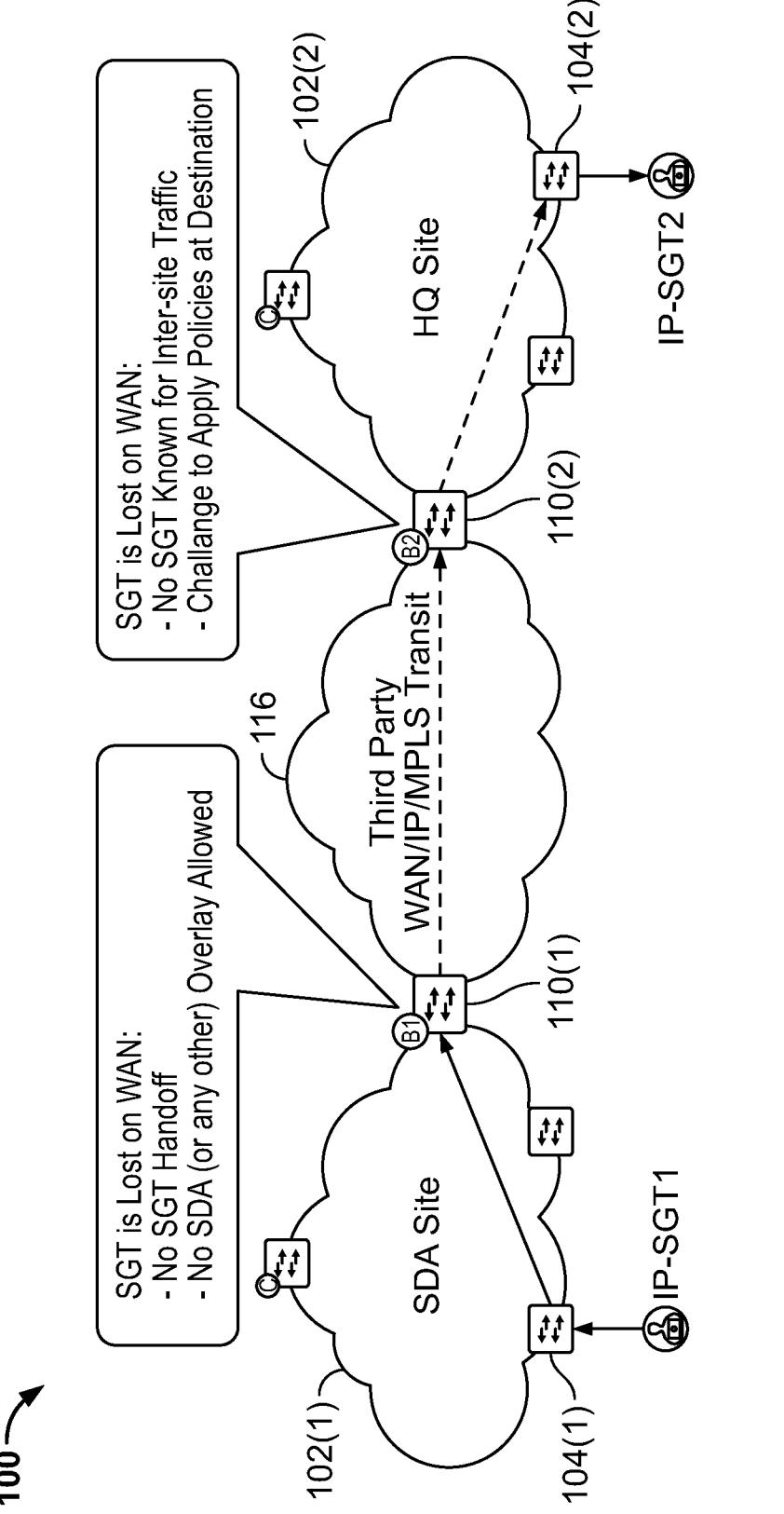
FIG. 1 illustrates a system-architecture diagram of an example network containing multiple devices of external sites interconnected without inline Security Group Tag (SGT) capabilities.

This disclosure describes techniques for enforcing security policies for entities located, for example, outside a fabric network, at external sites that are interconnected and not capable of communicating traffic between the external sites where source IP is configured with security tag mappings for disseminating policies at site destinations. In some embodiments, one or more methods may be implemented at least partially by a system of devices and or components associated within a network fabric connected and in communication with a system of devices and or components associated with an external network. In some instances, a first method may include analyzing one or more first packets communicated between external sites by a policy service control plane of a network fabric or connected cloud and identifying, from the one or more first packets, SGT mapping at a border of the external site for reassociating the SGT mappings with the communicated inter-site traffic.

The first method may include operatively coupling a policy service control plane to a first border at a first site and to a second border at a second site and operatively coupling the first border of the first site to the second border of the second site. Further, subscribing at the first border of the first site, by the control plane, a first security group tag (SGT) mapping associated with a first data packet at the first site for storing the SGT mapping of the first data packet at a network mapping system of the policy service control plane. Then, transmitting the first data packet from the first border of the first site to the second border of the second site via a communication path that is configured without SGT propagation capability resulting in the transmission of the first data packet inter-site with the first SGT mapping lost. In response to a determination by the policy service control plane that the first data packet has reached the second border or is in use at the second site without an SGT mapping, identifying by the control plane the SGT mapping associated with the first data packet based at least on an SGT resolution process initiated at the second border of the second site that results in the first SGT mapping being re-associated with or re-applied to the first data packet at the second border for policy distribution to in-site destinations.

In some instances, a second method may include subscribing at the second border of a second site, by the control plane, a second SGT mapping associated with a second data packet at a second site for storing the second SGT mapping of the second data packet at the control plane. Then, transmitting, the second data packet directly from the second border of the second site to the first border of the first site without the SGT mapping associated with the second data packet. In response to a determination by the control plane that the second data packet has reached the first border, identifying, by the control plane, the second SGT mapping associated with the second data packet at the first border to enable the second SGT mapping to be re-associated with the second data packet at the first site.

The systems and methods described herein provide processes directed to applying a conversational learning process to determine whether to continue to preserve an entry for the first SGT mapping in the local mapping system at the second site or the first site based on data packet usage at either site; evicting the first SGT mapping from at least one of the first border or the second border when the SGT mappings are learned by the control plane to be no longer required for propagating of policies associated with the first data packet; and analyzing at least the first packet data transmitted between the first border and the second border by the control plane to determine whether to initiate an SGT resolution process to enable subscribers at either border to determine an SGT mapping with an unknown address associated with the first data packet.

Additionally, the techniques described herein may be performed by a system and/or device having non-transitory computer-readable media storing computer-executable instructions that, when executed by one or more processors, performs the method described above.

EXAMPLE EMBODIMENTS

In general, making group-based classification and policy enforcement decisions at the ingress fabric edge for destinations that are local and/or known to the network fabric may be done by provisioning, learning, and/or downloading the Internet Protocol address to Security Group Tag bindings (IP-SGT bindings) from a security/policy engine. This is because the local IP address prefixes are known, preconfigured prefixes with a security group tag assigned via IP-SGT bindings.

Security Group Tag (SGT) or Scalable Group Tag is an 8-bit part of the VXLAN header defined in IETF vxlan-group-policy, which can be used to assign a numerical group policy id for every packet at an ingress VTEP. Further, at the egress VTEP, a policy such as denying or allowing traffic based on source and destination SGT may be applied. Network device manufacturers enable the usage of this VXLAN header information to create granular network segmentation between endpoints, and to restrict or allow communications between hosts inside a VNI that has a specific SGT assigned. By using SGT information, a flexible and easy-to-manage Access Control can be deployed without using traditional IP-based Access Control Lists The use of endpoint authentication secures access to production networks, enables dynamic assignment of endpoints into an appropriate network segment (VN), enables dynamic access control of endpoints within a VN by assigning an SGT tag for endpoints, and allows integration with firewalls and other related systems to further leverage endpoint identity on system-specific access and authorization controls.

However, because external network destinations (e.g., internet destinations, external data center destinations, etc.) cannot be preconfigured and cannot be preassigned with a security group tag, all internet destinations are categorized by default as having an unknown destination group tag. As a result, external network destinations cannot be treated similarly to known fabric destinations for group-based classification and policy enforcement perspectives at the fabric edge. When a default ETR or service ETR is registered to a control plane (e.g. LISP map-server node) of the network fabric using an enhanced LISP method of border registration, the security group tag for the external traffic (e.g., internet traffic or service specific-traffic) may also be registered at the control plane and stored in a border/service registration table. If the destination is external (e.g., the internet or specific service), then the control plane device may retrieve the SGT from the border/service registration table, which, in contrast to the map registration table, is not specific to an IP address prefix but specific to a service or the internet.

In the implementation, edge network devices have built-in hardware capabilities that can send and receive packets with SGT embedded in the MAC (L2) layer. This feature is called Layer 2 (L2)-SGT Imposition. It enables ethernet interfaces on the device to be enabled for L2-SGT imposition so that the edge device can insert an SGT in the packet to be carried to its next-hop ethernet neighbor. SGT-over-Ethernet is a method of hop-by-hop propagation of SGT embedded in clear-text (unencrypted) ethernet packets.

In non-external networks, trust security can be supported with SGT Exchange Protocol V4 (SXPv4) feature that supports Trust Security metadata-based L2-SGT. When a data packet enters a Trust Security-enabled interface, the local IP-SGT mapping database (with dynamic entries built by a publication mechanism or populated by SXP, and/or static entries built by configuration commands) is analyzed by the policy service control plane for registration of SGT mappings and to learn the SGT mapping corresponding to the source IP address of the packet, which has been communicated inter-site without the SGT packet attached. In this case, the SGT is then inserted into the packet based on the SGT mapping received at the border and carried throughout the external site within the header to edge network devices or other destinations within the particular external site.

In some embodiments that are configurable per VRF basis to constrain registrations to traffic in inter-site VNs; the border registers overlay subnet prefix to SGT bindings in the SGT control plane. The border registers only exceptions as 32/EID with the SGT in the SGT control plane. The border does not register every 32/EID with the same SGT subnet prefix, this aids in scaling the solution more efficiently than SXP or a second-level optimization system. There is also an option with this process to perform summarization with the group tag registration.

In some embodiments, at the egress edge of an external network, the group assigned to the packet's destination becomes known. At this point, access control can be applied. With Trust Security, access control policies are defined between the security groups and are referred to as Security Group Access Control Lists (SGACL). From the view of any given packet, SGACL is sourced from a security group and destined for another security group. The SGT tag received in a packet from a trusted interface is propagated throughout the network and is also used for identity firewall classification.

When IP security support is added, the received SGT tag is shared with IP security for SGT tagging as mentioned above, the SGT may not be able to be communicated across the network as obstacles may occur when attempting to enforce security policies for entities located behind a wireless endpoint (or any host device) or when in transit inter-site with no inline SGT propagation capability.

This disclosure describes techniques that enable the enforcement of policies for bridged external sites, (and may apply to VMs as well) where the external site information (e g., MAC address, IP address, etc.) is learned locally and uploaded to a centralized or virtually configured policy service control plane that stores and registers the respective SGT mapping of each IP source within an external site for distribution to forwarded packets at borders of external sites.

The architecture of the on-demand control plane to carry group tag binding includes a policy service control plane that may be configured as a central segment of the group-based policy overlay that can store policy group mappings from all or nearly all the sites that are needed to be requested on-demand. The egress border may include components or devices that are responsible for learning all or nearly all of the group mappings present in a specific site and uploading the information about the group mappings to the Policy Service control plane shared across sites. The ingress border may include components and devices that enable retrieving group mappings from the policy service control plane. In some embodiments, the ingress border may retrieve SGT mappings corresponding to the sources of IP traffic ingressing (i.e., being sent) to specific sites. This information can allow the reconstruction of encapsulated packets with source SGT information.

Although the systems and methods described herein are discussed with respect to one or more component hosts, these systems and methods may be used with any type of device or system. Further, although particular examples are discussed with reference to component machines, alternate embodiments may include other types of devices including virtual devices that are bridged or located on a centralized connected (internal or external) platform.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network 100 containing multiple devices, and multiple Software-Defined Access (SDA) sites that are connected over non-SGT-capable network media. As shown in FIG. 1, an external network 116 includes an SDA site 102(1) that is interconnected to another SDA site 102(2) using a third-party provider communication network (an external network 116). The external network 116 may include an inter-site network that is prevented or configured not to be capable of carrying SGTs that are banded to IP addresses. The external network 116 can be any one of or a combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The external network 116 may include devices, virtual resources, or other nodes that relay packets from one network segment to another by nodes in the network. In some embodiments, the external network 116 can be configured outside a network fabric with borders to the fabric network. The data communication network of the external network 116 can also include (i.e., Multiprotocol Label Switching (MPLS), SDWAN (software-defined wide area network) SDWAN, or other wide area network WAN transits) are either incapable or explicitly prevented from carrying group tags.

In some embodiments, an egress border device 110(1) may be configured at an egress of the SDA site 102(1) with an edge device 104(1) at a source of the site containing the source IP address and SGT (IP-SGT1). In the example, at the egress, the egress border device 110(1) is configured to forward data packets or traffic from the source of the SDA site 102(1) that are identified with the edge device 104(1) to the ingress border device 110(2) at the SDA site 102(2) via the external network 116. The IP addresses and SGT may also be mapped internally and stored at the SDA site 102(1). In this case, the egress border device 110(1) may learn the mappings of the SDA site 102(1). In an implementation, the data packets generated by the egress border device 110(1) (i.e., the source client device) are sent to the ingress border device 110(2) (i.e., the destination client device) on the external network 116 which is a distributed network, and the data packets may be encapsulated or not with the SGT (i.e., banded with the SGT) to be transported over the distributed network. Since the external network 116 is configured to be not capable or prevented from carrying the SGT, the SGT is lost when the data packet is sent by the egress border device 110(1) to the ingress border device 110(2). Hence, the policy data associated with the SGT assigned to the data packet is not communicated via the communication pathway of the external network 116. Since the SGT cannot be propagated outside the fabric, the destination client device (the egress border device 110(2)) requires reclassifying to apply the SGT for the source using an SXP to distribute the IP-SGT2 to the edge device 104(2). Also, the data packets received at an egress border device 110(1) which may be considered an egress network device from a source client device (the edge device 104(1), may also propagate the data packets via additional network devices to reach also egress network devices (i.e., other ingress border devices 110(2)) over an external distributed network. When the data packets reach the egress network device connected to other destination client devices, the egress network device will also need to enforce the network policy based on a match between the SGT of the source IP address and the SGT of the destination IP address for a network policy to be configured as an end-to-end user or group policy that is enforced at all egress and ingress network devices in an external network 116.

As such, anytime the data packets are communicated inter-site because the SGT is disassociated with the IP address, the SGT is lost when packets are transmitted over the communication network of the external network 116 outside a fabric network because the is no mechanism to handoff the SGT to the SDA in the external network 116 or any other overlay mechanism configured to bind the SGT to the IP when data packets are in transit in the external network 116. In some embodiments, when connecting SDA sites via third-party WAN providers, often there is required an IP handoff to interconnect the sites or explicitly block the use of VXLAN-GPO encapsulation on top of their network. Also, Maximum Transmission Unit (MTU) across the site may not be in control of the enterprise. Also, managed service provider (MSPs) delivers services, such as network, application, infrastructure, and security, via ongoing and regular support and active administration on customers' premises are also not likely given network control. If the SGT is lost on the WAN, or there is not an SGT known that is banded with the packets for the inter-site traffic. In this case, it is challenging to determine what if any policies should be applied at the destination, and the wrong policies or no policies can result. This can result in not allowing group-based policies used at egress routers and this can result in the network administrator being forced to select intermediate vantage points of policy application that can compromise the overall scalability of a deployed system As described in more detail later in this disclosure, one or more devices (e.g., a system of devices) may enable the enforcement of policies for bridged border devices at external networks where the SGT bindings from local site maps containing information (e.g., MAC address, IP address, etc.) is learned by the border devices and communicated to each other via a control plane within a fabric network. The SDA sites at host sites may be configured in a bridge mode and obtain their respective SGT to IP address(es) through the control plane interface. The above-noted example is merely illustrative, and various changes may be made to achieve similar or the same results.

Figure 2:
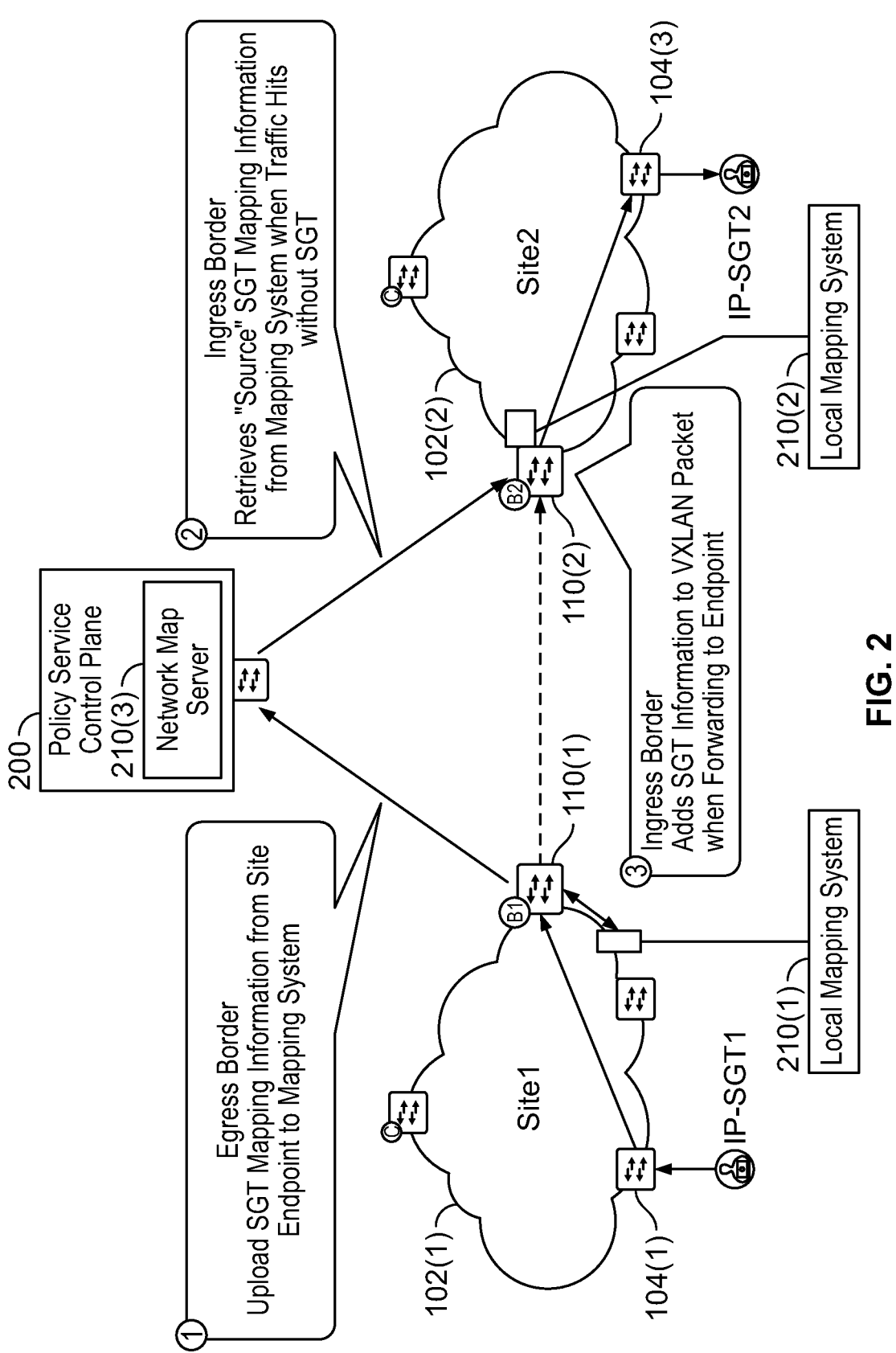
FIG. 2 illustrates a system-architecture diagram of an example network containing multiple devices of external sites interconnected and also borders of the external sites coupled to a policy service control plane that enables propagation of the SGT mappings between the external sites.

FIG. 2 illustrates an on-demand control plane architecture with a fabric network operating with external networks that include a policy service control plane 200 carrying group tag bindings between distributed sites of the external network in accordance with various embodiments. FIG. 2 is similar to FIG. 1 but includes additional details of the architecture of the control plane 200 (i.e., a virtual layer) that supports the group tag distribution. In an implementation, the control plane 200 can be configured to implement VXLAN as a data plane encapsulation protocol and LISP as a control plane protocol with the network mapping (map server) system 210(3) configured at the policy service control plane 200.

In some embodiments, the egress border device 110(1) subscribes to a local mapping system 210(1) and uploads learned mapping from the SDA site 102(1) to a global or remote mapping platform at the policy service control plane 200. Initially, the egress border device 110(1) may register local mappings of bindings at a discovery or registration setup stage that are learned (i.e., from stored group tag bindings) at a local map server 210(1) configured at the SDA site 102(1). For example, at the egress border, the edge device 104(1) uploads SGT mapping information from the site endpoints to the local mapping server 210(1) (local mapping system) and then to the map server 210(3) (i.e., a global or virtual network map server) at the (SGT) policy service control plane 200 that is configured with an on-demand control-plane architecture to carry up-to-date sets of group-tag bindings to be distributed at linked SDA sites that are external to the fabric network and cannot communicate the group-tag bindings with communicated traffic between the external SDA sites.

Similarly, at one or more SDA sites 102(2) at ingress border devices, local map server 210(2) learned the information on group tag bindings may also be uploaded to the network map server 210(3) of the control plane 200. In this way, the control plane 200 is configured with a set of group tag bindings from multiple SDA sites in the external network 116.

To keep the control plane 200 updated with real-time or current data of group tag binding for on-demand distribution, when traffic flows between SDA sites, the ingress border on a receiving site, evaluates via the ingress border device 110(2) the source address of the data packet (i.e., an ingress data packet). If information about the source SGT is not known, the ingress border device 110(2) at the ingress border initiates an SGT resolution with the policy service control module (network map server 220) at the policy service control plane 200. In some embodiments, the network map server 220 replies via the policy service control plane 200 with the corresponding SGT mapping that is cached locally on the ingress border device 210(2). For example, it may be cached at a router configured at the ingress border.

Once the information is cached, the ingress border device 210(2) (such as a router configured at the border) adds the source of the SGT mappings that is locally cached at the ingress border device 110(2) before sending the packet data to the destination in the SDA site 102(2). This enables reliable distribution of the egress policies in the external network. Also, updates based on subscription or usage tracking at ingress borders coupled to the policy service control plane 200 may be learned and updated from map requests sent by the policy service control plane 200 to one or more ingress border devices 104(2) when the data packets are received. In some embodiments, the policy service control plane 200 may analyze data packets sent to an ingress border device 104(2) and reply with the respective group tag binding. For example, the egress border device 110(1) "B1" learns the "IP1-SGT1" mapping from the SDA site 102(1) and registers the mapping with the map server 210(3) at the policy service module (i.e., service router) of the policy service control plane 200

Hence, the group tag bindings (IP, SGT) are registered to a network mapping system (e.g., a map server 210(3)) in a software-defined access (SDA) network with the fabric network. The network map server 210(3) may update and maintain the IP-SGT bindings in a mapping database of the policy service control plane 200, and the IP-SGT bindings may be registered using a subscription publishing mechanism implemented by border device at the external sites that rely on SGT mapping data from local mapping systems at the local site.

In some embodiments, at site 2, the destination device may also learn about SGT mapping and register them at the local mapping system at site 2. Again, similarly to site 1, all the learned mappings are then uploaded to the shared policy service control plane. The policy service control-plane stores all the mappings for an on-demand redistribution. The border device may register an SGT mapping with devices of the policy service control plane 200 (e.g., with a LISP map-server component of the policy service control plane device(s)) that is to be assigned to any internet or external network traffic that is to be sent through the border 110(2) (i.e., border node).

In some embodiments, for efficiency at the ingress border "B2" 110(2), the policy service control plane 200 analyzes (i.e., sees the traffic) traffic from a source address IP1 to IP2 and pulls the local "IP1-SGT1" mapping information from the local mapping system 210(2). This information is cached and added to encapsulated traffic sent within site "2". Alternately, based at least in part on receiving the map-request message, the policy service control plane 200 (e.g., the LISP map-resolver component of the control plane device(s)) may send a map-reply message (e.g., LISP map-reply message) to the border device 110(2). The map-reply message may indicate a routing locator identifier associated with the border device 110(2). Additionally, the map-reply message may indicate a security group tag that is associated with the border 110(2) and/or the external network 116. Additionally, the security group tag may indicate that the external network device comprises an internet or external destination not local to the network fabric.

Figure 3A:
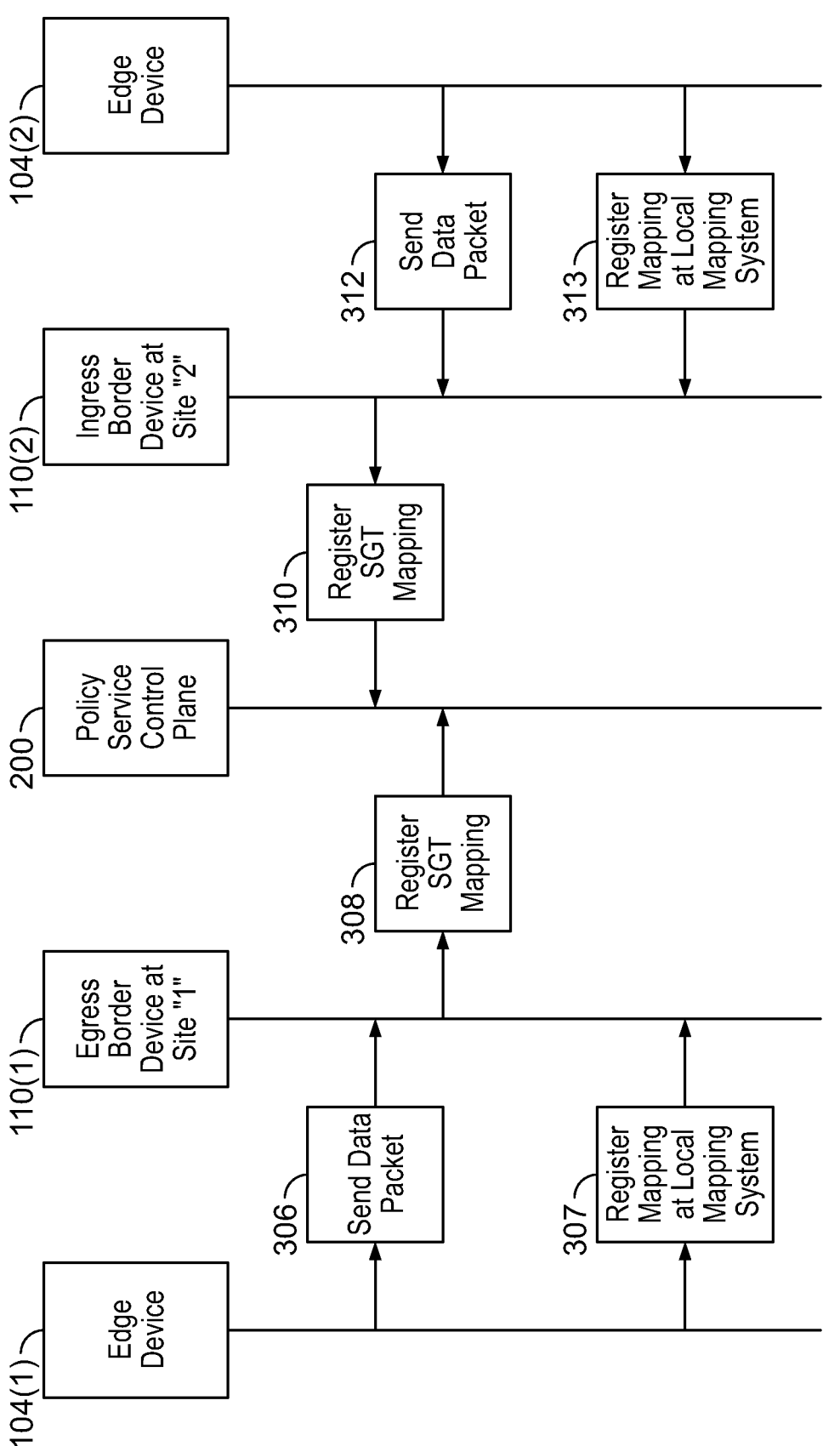
FIGS. 3A, 3B, and 3C illustrate diagrams of an example traffic flow between an egress border and ingress border of multiple interconnected external sites in a communication path with no inline SGT propagation capability and evaluation of the source address of the egress packet to initiate an SGT resolution process with a policy service control plane for corresponding SGT mapping at the ingress border of the external site.
Figure 3B:
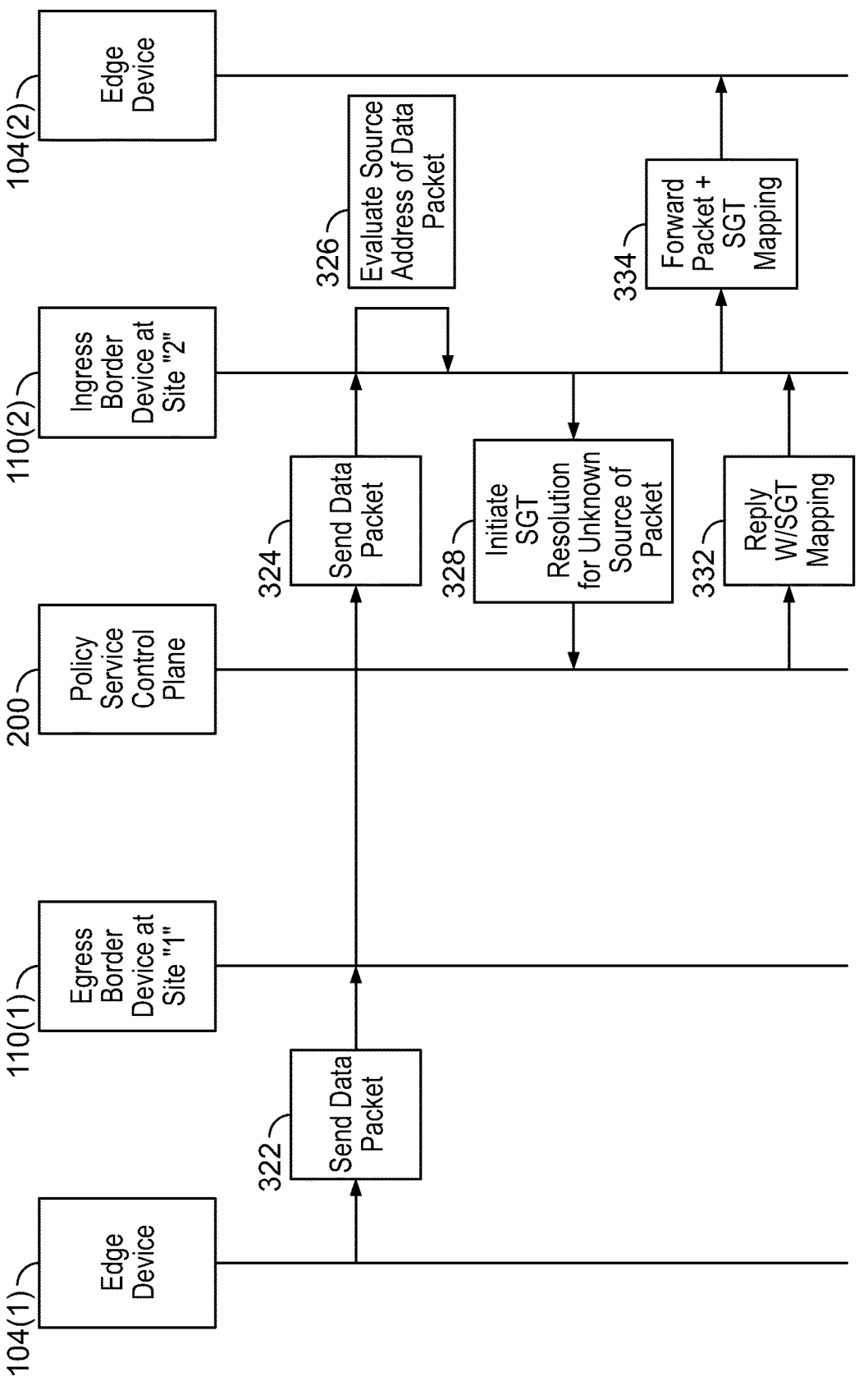
Figure 3C:
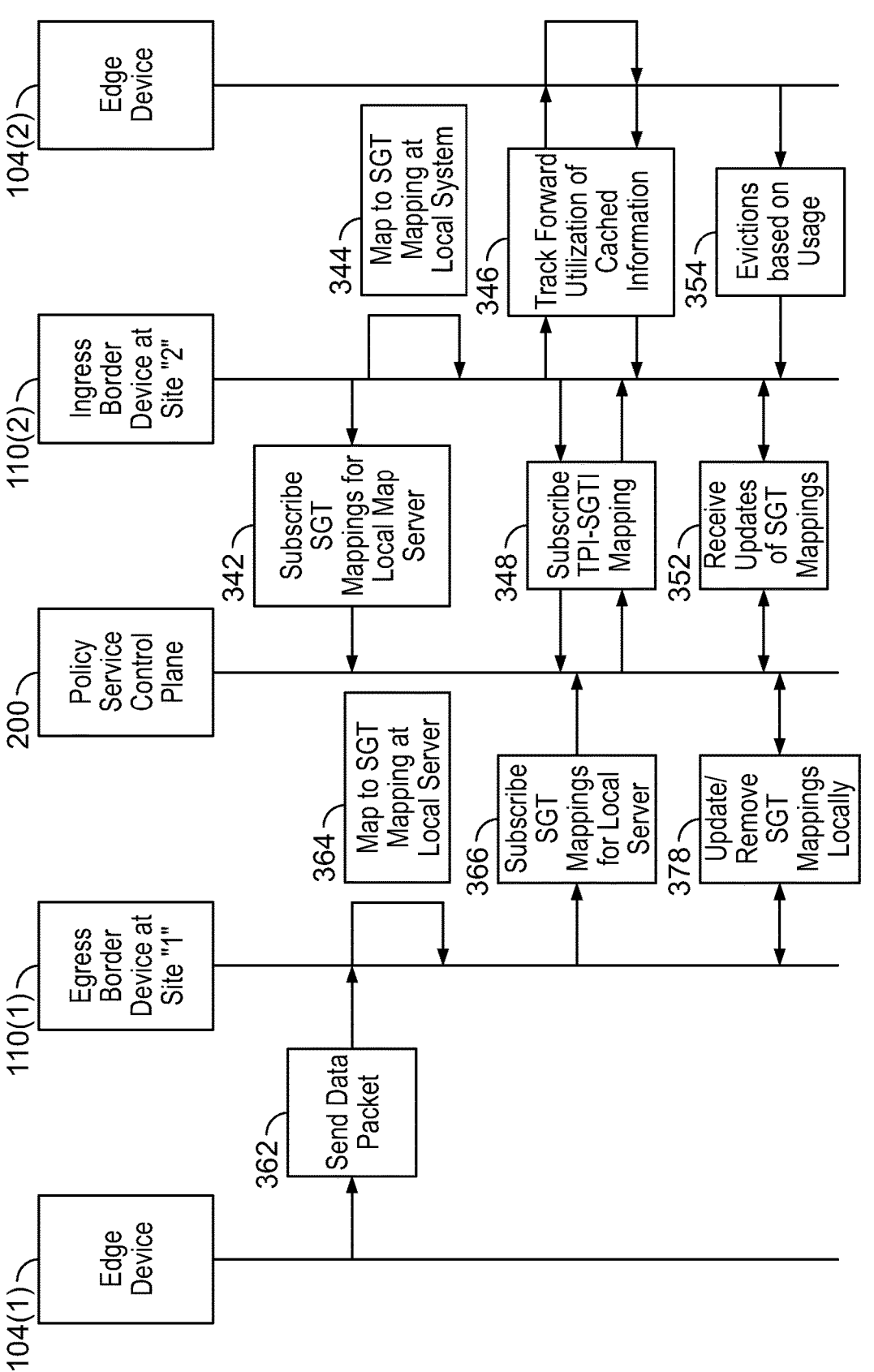

FIGS. 3A, 3B, and 3C are diagrams illustrating an example traffic flow 300 between an egress border and ingress border of multiple interconnected in a communication path with no inline SGT propagation capability and evaluation of the source address of the egress packet to initiate an SGT resolution process with the policy service control plane for corresponding SGT mapping at the ingress border.

(A) Discovery (and Policy Service Control-Plane Population):

In FIG. 3A, at 306, the edge device 104(1) may send a packet to an egress border device "B1" 110(1). The packet may include an IP address and SGT. The edge device (i.e., the user device) 104(1) edges in a specific external SDA site (that supports group-tag distribution) learns about the SGT binding (i.e., IP1-SGT1) and registers it at 307 with the local Mapping System at the SDA site ("site 1") 102(1). An egress border device "B1" 110(1) subscribes to the local mapping system at the SDA site 102(1) "site 1" and learns about the local SGT bindings (i.e., the SGT mappings that belong to "site 1"). During registration process 308, all the bindings are uploaded to the policy service control plane 200 for on-demand redistribution. The policy service control plane 200 stores all these mappings in a network map server 210(3) for on-demand redistribution. The egress border device "B1" 104(1) learns about the IP1-SGT1 mapping from "site 1" and registers the mapping with the policy service control plane 200. The border device at "B1" 110(1) may also be configured to upload or publish any updates of the IP-to-SGT mapping in the local mapping system 210(1) that are learned to upload to the policy service control plane 200.

At the SDA site "site 2" 102(2), the ingress border device "B2" 110(2) (i.e., the "receiving router or hub") may at 312 send a packet. It may also learn about SGT binding from an edge device 104(2) of "site 2" and register them at 313 at the local mapping system 210(2) at site 2. Again, similarly to the registering and learning process at "site 1", nearly all or most of the learned binding at 310 are then uploaded to the shared policy service control plane 200. The policy service control plane 200 stores all the mappings in a database for an on-demand redistribution. Each border device (ingress border device or egress border device) may register SGT mappings and subscribe to SGT mappings from the policy service control plane 200 (e.g., with a LISP map-server component of the policy service control plane 200) where the SGT mappings are to be assigned to any internet or external network traffic that is to be sent through the border device (in this case the ingress border device 110(2)).

(B) Distribution (On-Demand Learning on Ingress Borders)

With reference to FIG. 3B, when traffic flows at 322 between the two SDA sites 102(1), 102(2) at 324, the ingress border device 110(2) on receiving a site evaluation at 326 of the source address in ingress packets; and when information about the source SGT is unknown for a particular source, the ingress border device 110(2) initiates an SGT resolution at 328 with the policy service control plane 200. As a result, the policy service control plane 200 replies with the corresponding SGT mapping stored in its map server 210(3) that are cached locally on the ingress border device "B2"10(2) (i.e., a border router). Once information is cached, the ingress border device (the border router) at 332 adds the source and the SGT to a local mapping system and the packets before sending them at 334 to the destination or edge router 104(2) in the site ("site 2"). Using this information egress policies can be applied normally. Illustrated in FIG. 3B, the ingress border device "B2" 110(2) sees the traffic at 326 from IP1 to IP2 (See FIG. 2) and pulls IP1-SGT1 mapping information from the policy service control plane 200. This information is cached and added to encapsulated traffic sent within the SDA site 104(2) "site 2".

In some embodiments, based at least in part on receiving a map-request message or the like, at 328, the policy service control plane 200 (e.g., a LISP map-resolver component of the policy service control plane 200) may send a map-reply message (e.g., LISP map-reply message) to the ingress border device "B2" 110(2). The map-reply message may indicate a routing locator identifier associated with the ingress border. Additionally, the map-reply message may indicate a security group tag that is associated with the ingress and/or the external network 116. Additionally, the security group tag may indicate that the external network device comprises an internet or external destination not local to the network fabric.

In some embodiments, the ingress border device "B2" 110(2) may work with a fabric edge device (instead of the policy service control plane 200) such as a tunnel router that may use a Locator ID Separation Protocol (LISP) to provide flexible address assignment. The fabric edge device may provide an IP address and SGT for each of the ingress border devices "B2" 110(2) at the SDA site 102(2) "site 2".

In some embodiments, the map server may communicate the IP and SGT information to the fabric edge, such as interested routing locators (RLOCs) on which the ingress border device 110(2) is connected. The map server may notify the ROLCs that have the IP (e.g., the IP gets registered by the ROLC during DHCP/SISF/LISP).

(C) Updates (Subscriptions and Usage Tracking on Ingress Borders)

With reference to FIG. 3C, to provide accurate tracking of SGT mappings, the ingress border device 110(2) at the ingress border subscribes at 342 with the policy service control plane 200 to receive every mapping, or at least most of the current mapping related to traffic at its SDA site that are cached locally at 344 with its local mapping system 210(2). This allows different ingress borders that subscribe to the policy service control plane 200 to quickly adapt to the SGT mapping changes on the remote SDA site. Additionally, at 346, the ingress border device 110(2) at the ingress border based on the subscribed mappings received from the policy service control plane 200 also tracks at 348 forward levels of utilization of cached information such as the use of the local group tag mappings with IP traffic at its site. To preserve the scalability of the solution, ingress borders perform aggressive cache eviction at 354 entries when they are not used for a certain amount of time. The ingress border device "B2" 110(2) subscribes at 348 with a policy service control plane to track IP1-SGT1 mapping. If the mapping changes (i.e., any updates received at 352), the policy service control plane 200 sends an update at 352 to ingress border device 110(2) "B2" to refresh its local cache. In some embodiments, at the border, a publication-subscription mechanism may be implemented where the border subscribers (i.e., the border network devices and local mapping system) subscribe to all SGT updates. The border network devices and local mapping systems thus get all these updates (IP-SGT) published to it before the data packet arrives from an interconnected site. Additionally, in the model by default, the published SGTs are per subnet, any exception in that subnet is sent as/32 IP-SGT entry so that the scale and performance on the border are improved and exceed existing mechanisms provided by SXP.

In some embodiments, the site map-server (i.e., the local map server system) publishes the IP-Prefix to the SGT mapping via the border network devices to send to the policy service control plane 200 (i.e., a transit SGT-map-server). The policy service control plane 200 based on where the registrations that come from a particular local map server system, sends the IP-SGT for that prefix to all other sites except the source site (e.g., using filtering based on the domain ids or the like).

Additionally, if traffic (such as data packet sent at 362) between site 1 "IP1" and site 2 "IP2" stops for a while, the ingress border device "B2" 110(2) actively removes at 354 the SGT1 mapping cache when it detects that is not being used. Additionally, the mappings at 364 at the SDA site "1" 102(1) are also subscribed to the policy service control plane 200 at 366 and similarly tracked/updated at 378 by the SGT mappings egress border device 110(1) with the local mapping system 210(1) at site "1".

In some embodiments, the mappings at multiple different enterprise SDA sites using different data-plane technologies that are capable of carrying group policy tags but without the possibility of handoffs between sites, can subscribe to the policy service control plane 200 and track/update locally stored SGT mappings. The policy service control plane 200 is location agnostic in deployment and will not affect the functionality of the external network. In some embodiments, the policy service control plane 200 may be deployed in the cloud.

Figure 4A:
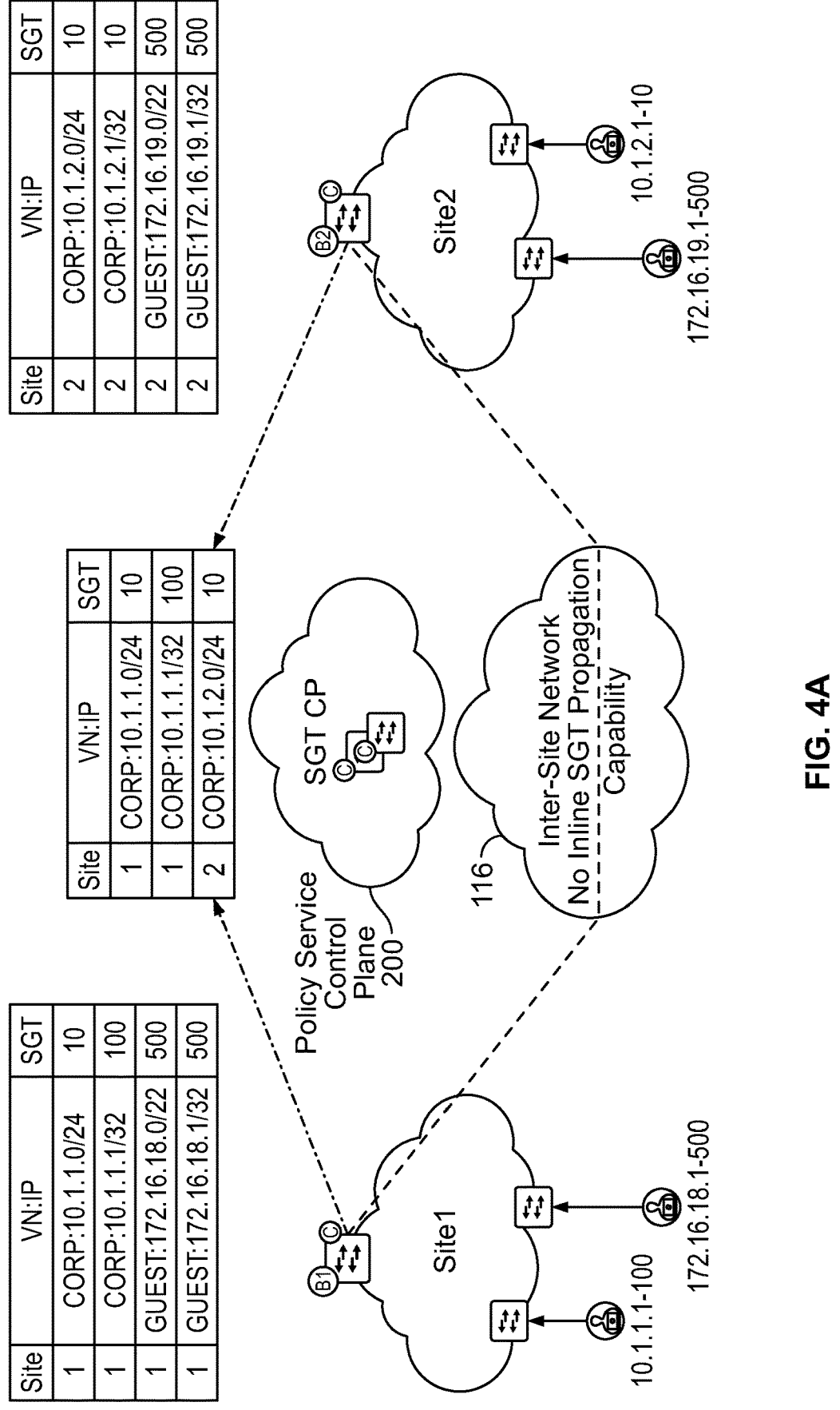
FIGS. 4A, 4B, and 4C illustrate a set of snapshots of different scenarios in a course of operation of an example method of data packet transmission of interconnected external sites that transmit data packets without SGT mappings and reapply the SGT mappings at ingress borders of the external sites.
Figure 4B:
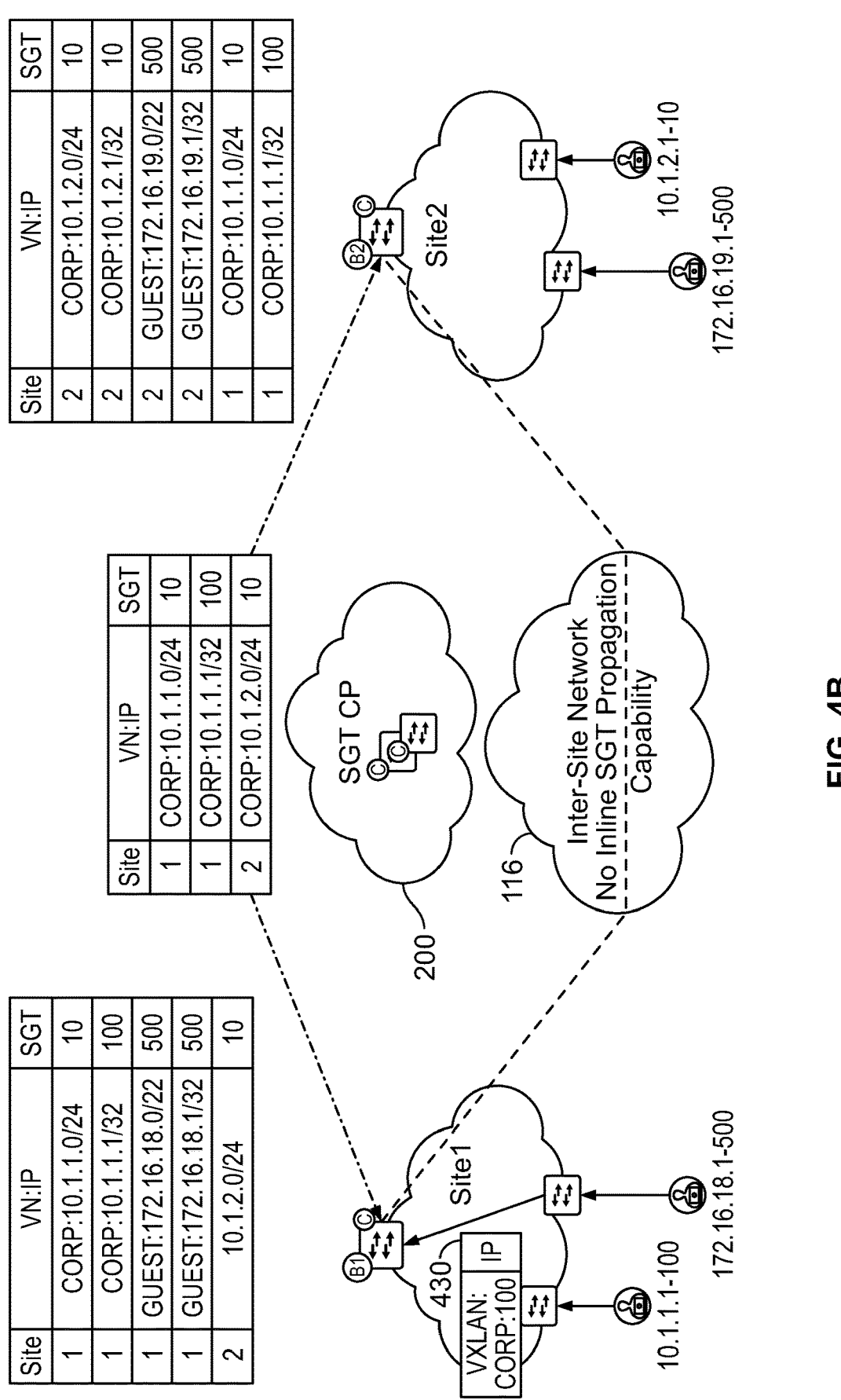
Figure 4C:
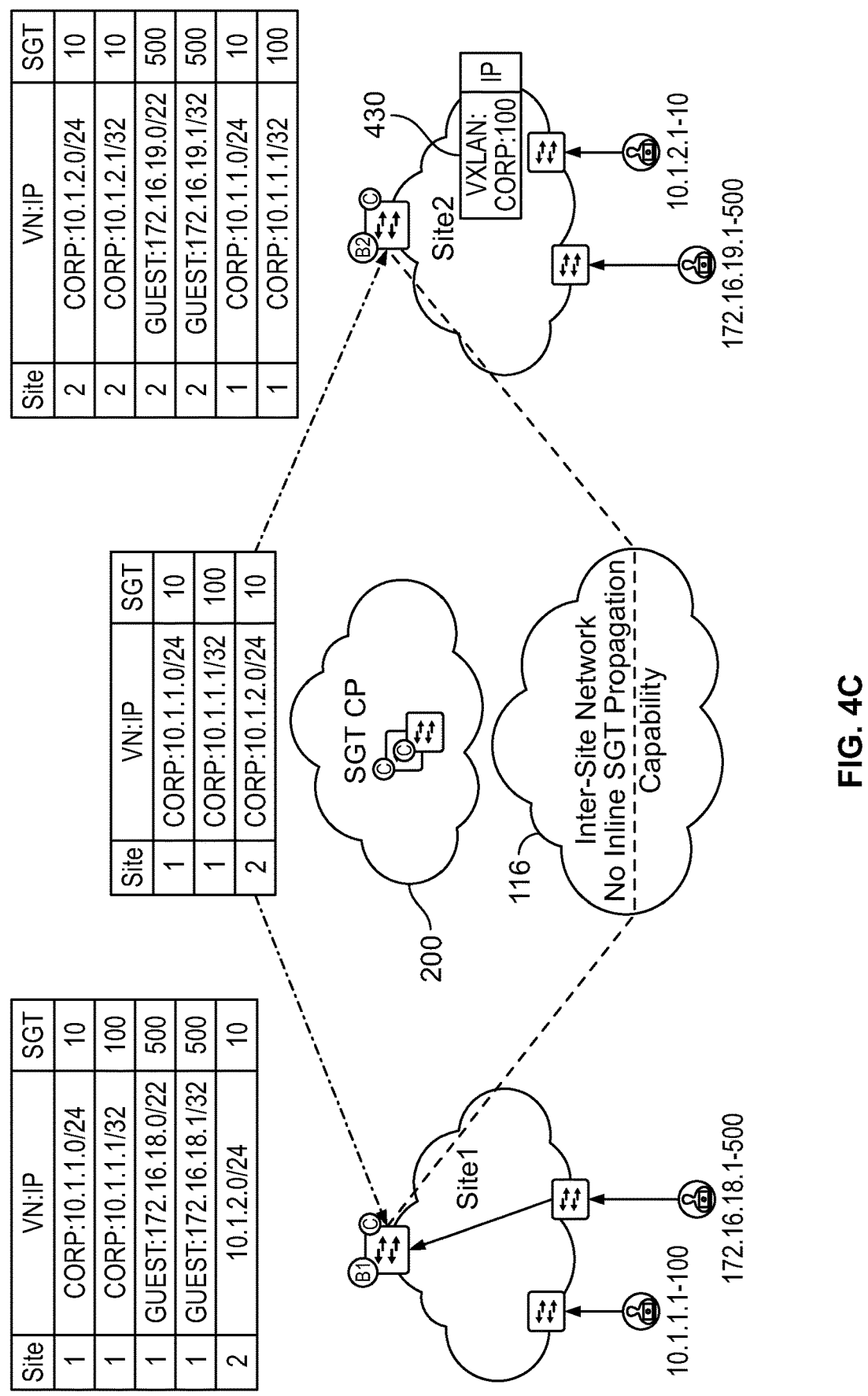

FIGS. 4A, 4B, and 4C illustrate a set of snapshots of different scenarios in a course of operation of an example method of data packet transmission of interconnected sites without SGT mappings and identifying the SGT mappings at borders of external sites, and applying techniques associated with conversational learning of this disclosure for SGT mapping evictions at borders of external sites.

Referring to FIG. 4A, diagram 410 depicts a scenario of registering the SGT-IP mapping and sending a packet across site 1 to site 2 which are connected in an inter-site network that is not capable of carrying the SGT group tag. As shown in FIG. 4A, initially with the publication subscription, the group tags at each site are registered in each local control plane or a border router at each site. The entries are then registered to the SG-control plane. In this case, the entry VN: IP 10.1.1.0/24 is registered from site 1 at the SGT CP with the SGT "10". Likewise, at site 2, the entry VN: IP 10.1.2.0/24 is also registered with the same SGT "10". If the child entry is composed of a different group tag, this is then the only entry that is registered at the SGT control plane for efficient scaling in a deployment; in this case, the child entry 10.1.1.1/32 is registered with the different group tag "100". The endpoints with the same group tag are summarized.

Referring to FIG. 4B, as the data packet 430 is traversing from site 1 to site 2 (from border "B1" to "B2"), the SGT is lost at "B2". However, the SGT mapping is available at the policy service control plane 200 via a subscription model by the policy service control plane 200 to the respective local map servers.

Referring to FIG. 4C, the SGT mapping is then re-applied at border B2 (when the data packet 430 is detected) and then carried to the edge, so the SGT policies can be applied to destination network devices. Also, there is conversational learning techniques that are applied at the border (B1, B2), the entry is not kept in the forwarding plane by the respective border devices, if there is no traffic. Only if there is traffic, is the entry stored in the forwarding plane. If the traffic flow stops, the border devices use a least recently used (LRU) mechanism or logic to determine whether to evict the SGT mapping (e.g., the IP-SGT binding) to free up the entry. The forwarding resource is therefore effectively used to store only SGT mapping that are in use. In some embodiments, the conversation-learning techniques enable the forwarding plane to track whether or not the mappings are being used or not.

The logical operations described herein with respect to FIGS. 1-2, 3A-C, and 4A-C may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations might be performed than shown in the FIGS. 3A-C, 4A-C, and 5-6 which are described herein. These operations can also be performed in parallel, or a different order than those described herein. Some or all of these operations can also be performed by components other than those specifically identified. Although the techniques described in this disclosure is with reference to specific components, in other examples, the techniques may be implemented by fewer components, more components, different components, or any configuration of components.

FIG. 5 illustrates a flow diagram of an example method 500 for propagating security group tags in an external network for enforcing policies at the edge of sites when the data plane coupling the sites is not capable of carrying the mappings of the SGT-IP. The operations described herein with respect to method 500 may be performed by various components and systems, such as the components illustrated and discussed herein.

In some embodiments, the described systems and methods may implement a deployment model that consists of one where multiple virtualized sites are interconnected using third-party providers (MPLS, SDWAN, or other WAN transits) which are not able to carry (or explicitly prevent) group tags.

In some embodiments, the described systems and methods connect when connecting SDA sites via third-party WAN providers that require an IP handoff to interconnect the sites or explicitly block the use of VXLAN-GPO encapsulation on top of their network.

In some embodiments, the described systems and methods may use LISP-based enterprise fabric. However, the systems and methods described herein can be used with any overlay/fabric network.

In some embodiments, the described system and methods may be divided into a flow sequence that consists of (1) discovery, (2) distribution (propagation), and (3) an update in network operations of SGT mappings with data packet flow between interconnected sites.

Operation 502 of method 500, may consist of one or more edge network devices at one or more external sites that are configured to receive a source IP address through a DHCP or be provisioned with a source IP address. The source IP address may include an SGT binding (i.e., SGT mappings) configured with the source IP address for policy service of the data packet when in use and when transmitted by one or more edge network devices, border devices, etc. at or from the external site.

(1) Discovery: At operation 504, the process may entail, one or more edge network devices of one or more external sites that support group-tag distribution, to be configured to learn about SGT bindings of data packets at a particular site and register the SGT binding with IP addresses at a local mapping system of the site. In this case, the local mapping server At operation 506, the process includes a border composed of one or more border network devices (i.e., routers, nodes, etc.) connecting the external site to other interconnected external sites, subscribing with the local mapping system of the site, and learning via the respective border devices all the local bindings of the site.

At operation 508, the process may perform an upload by the respective border devices at the border of all the learned bindings to a policy service control plane that is configured either at a connected fabric network or virtually configured in the cloud. The policy service control plane learns all (or nearly all or some amount) of the locally stored SGT bindings of the site and stores the set of SGT bindings at the policy service control plane. In some embodiments, the policy service control—the plane may register one or more SGT binding in a database as an entry in a network mapping system that is configured to be connected to all or most of the other external sites and to enable subscribers at the various external sites connected to the policy service control-plane to draw SGT binding associated with traffic to their respective sites. In an exemplary embodiment, a first border of a first site learns of "IP1-SGT1" mapping from site "1" (See. FIGS. 1-2) and registers the SGT mapping with the policy service control plane.

(B) Distribution: At operation 510, the process may evaluate the source address at an ingress border when the source SGT is unknown. The ingress border may unilaterally send a request to the policy control plane to initiate an SGT resolution process, the policy control plane may implement one or more different algorithms to identify the corresponding SGT mapping that is cached locally on the ingress border device (i.e., ingress border router). At operation 512, the process may add the source IP to the SGT to map with the data packet. For example, once the policy service control plane sends the identified SGT to the ingress border device, and the information from the policy service control plane is cached, it is added by the ingress border device to the SGT mapping to be banded with the data packet prior to forwarding the data packet to the destination. For example, the ingress border device "B2" 110(2) of FIG. 2, sees the traffic IP1 to IP2 and pulls the IP1-SGT1 mapping information from the policy service control plane. The information is cached and added to encapsulated traffic sent within site "2".

(C) Update: At operation 514, the process may perform an update of the SGT mapping to provide accurate tracking of SGT mappings. The ingress border device may subscribe to the policy service control plane for every mapping that has been cached locally. This enables the ingress border device to make SGT mapping changes fast and accurately on an external site. At operation 516, the process may apply conversational learning techniques to track the forward-level utilization of cached information and to preserve the scalability of the SGT mapping system. For example, the conversation learning techniques include aggressive evictions of entries that are not for a certain time by the ingress border device in the local mapping system. For example, if the ingress border "B2" (See FIG. 2), subscribes with the policy service control plane to track the source IP address and SGT mapping "IP1-SGT1" mapping, if the policy service control plane sends an update to the ingress border "B2" to refresh the local cache at the site "2"; then an active removal process may be initiated at the ingress border "B2". In an embodiment, if traffic between source IP address IP1 and IP2 (See FIG. 2) is stopped or ceases for a while, the ingress border device 110(2) will actively remove the SGT1 mapping cache if it detects it is not being used. Hence, the cache eviction policies are configured to be more aggressive to increase the scalability of the system. This policy propagation also can be implemented over any type of third-party WAN and even in instances where there is no or little interaction between the WAN provider and a local SDA site solution. At operation 518, the process may implement a publication subscription mechanism where the border devices subscribe to all SGT updates. The border devices in this case are able to receive updates (e.g., of IP-SGTs) published prior to the transmission of the data packet to the border of the external site. The local or site mapping system (i.e., the site map server) publishes the IP-Prefix for the SGT mapping via the border devices to the policy service control plane (i.e., to the transit SGT-map server). The policy service control plane based on where the registration originates, sends the IP-SGT for that prefix to all other external sites that it expects the source site will be needed (using filtering based on the domain ids).

FIG. 6 is a flowchart of an example method for applying SGT mapping to data packets that are transmitted between sites without inline SGT propagation capabilities.

At step 610, the method operatively couples a control plane to a first border at a first site and to a second border at a second site.

At step 620, the method operatively couples the first border of the first site to the second border of the second site.

At step 630, the method enables subscribing at the first border of the first site, by the control plane, a first security group tag (SGT) mapping associated with a first data packet at the first site for storing the SGT mapping of the first data packet at the control plane.

At step 640, the method enables transmitting, the first data packet directly from the first border of the first site to the second border of the second site without attaching the first SGT mapping associated with the first data packet while the first data packet is transmitted.

At step 650, the method enables in response to a determination by the control plane that the first data packet has reached the second border, identifying by the control plane the SGT mapping associated with the first data packet at the second border of the second site to enable the first SGT mapping to be re-associated with the first data packet at the second site.

Figure 7:
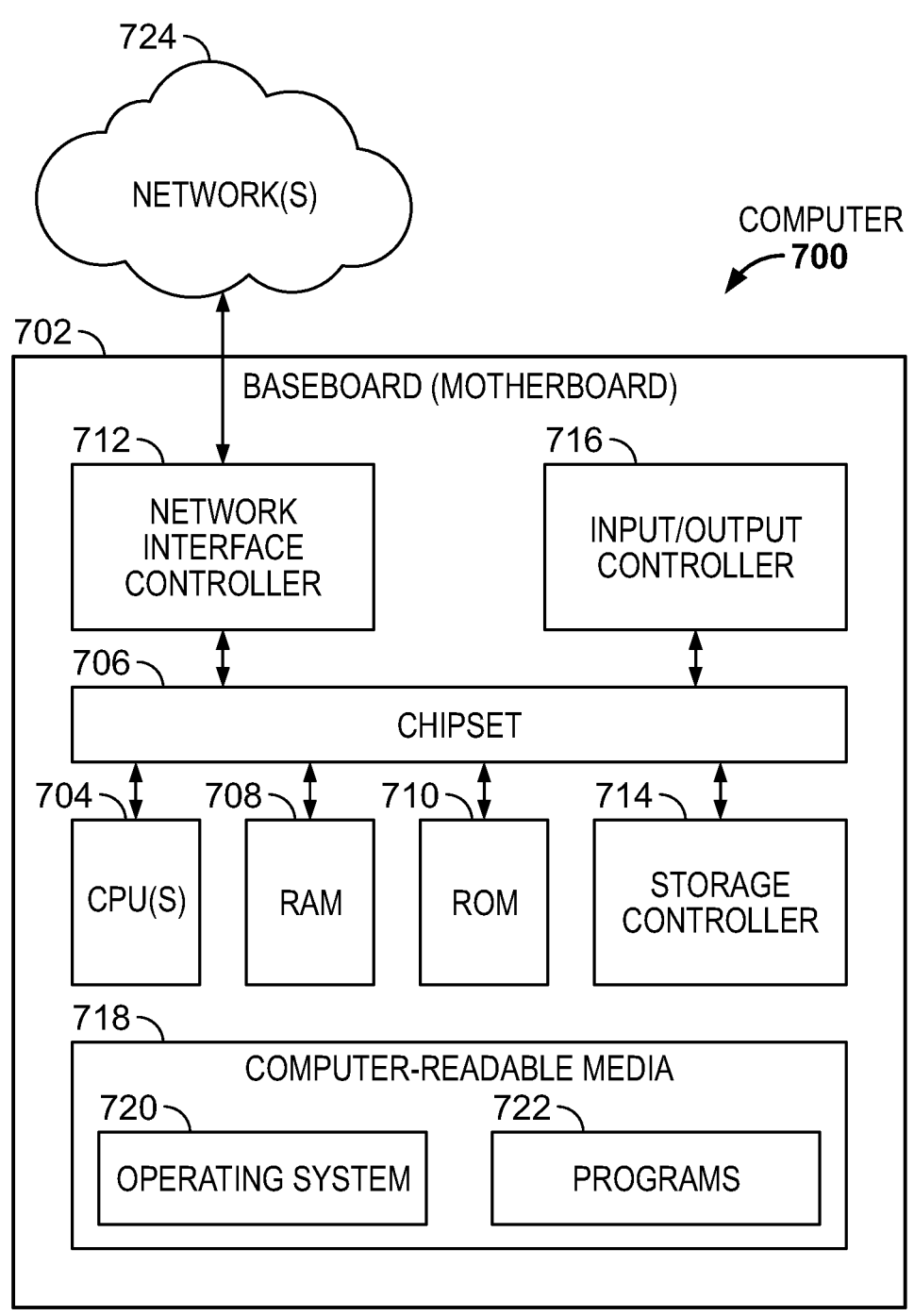
FIG. 7 illustrates a computer architecture diagram showing an illustrative computer hardware architecture for implementing a computing device that can be utilized to implement aspects of the various technologies presented herein.

FIG. 7 shows an example of computer architecture for a computer 700 capable of executing program components for implementing the functionality described herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to any of the servers, routers, or devices discussed herein. In some embodiments, computer 700 may include networked devices such as servers, switches, routers, hubs, bridges, gateways, modems, repeaters, access points, etc. Additionally, in some implementations, the programs or software discussed herein may be configured to perform operations performed by any of the devices. In some instances, the computer may correspond to any device described herein and be configured to perform operations performed by any device, and/or maybe a system of devices that perform the techniques described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPU 704 and the remainder of the components and devices on the baseboard 702. The chipset 706 can provide an interface to a RAM 708, used as the main memory in the computer 700. The chipset 706 can further provide an interface to a computer-readable storage medium such as read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as Network 724. The chipset 706 can include functionality for providing network connectivity through a Network Interface Controller (NIC) 712, such as a gigabit Ethernet adapter. The NIC 712 is capable of connecting the computer 700 to other computing devices over network 724. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other types of interfaces for physically connecting and transferring data between computers and physical storage units.

The computer 700 can store data on the storage device 718 by transforming the physical state of the physical storage units to reflect the information being stored. The specific transformation of the physical state can depend on various factors, in different embodiments of this description. Examples of such factors can include but are not limited to, the technology used to implement the physical storage units, whether the storage device 718 is characterized as primary or secondary storage, and the like.

For example, computer 700 can store information the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by devices described herein, and or any components included therein, may be supported by one or more devices similar to Computer 700. Stated otherwise, some or all of the operations performed by the border device (ingress border device 110(1), egress border device 110(2)), the policy service control plane 200, and or any components included therein, may be performed by one or more computer devices 700 operating in a system.

By way of example, and not limitation, computer-readable storage media can include volatile and non-volatile, removable, and non-removable media implemented in any method or technology. Computer-readable storage media includes but is not limited to, RAM, ROM, erasable programmable ROM ("EPROM"), electrically-erasable programmable ROM ("EEPROM"), flash memory, or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720) utilized to control the operation of the computer 700. According to one embodiment, the operating system comprises the LINUX operating system. According to another embodiment, the operating system comprises the WINDOWS® SERVER operating system from MICROSOFT Corporation of Redmond. Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPU 704 transitions between states, as described above. According to one embodiment, the computer 700 has access to computer-readable storage media storing computer-executable instructions which, when executed by the computer 700, perform the various processes described herein. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other types of input devices. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more a router, a border router, and/or a server. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

Clause 1. A method comprising: operatively coupling a control plane to a first border at a first site and to a second border at a second site; operatively coupling the first border of the first site to the second border of the second site;

subscribing at the first border of the first site, by the control plane, a first security group tag (SGT) mapping associated with a first data packet at the first site for storing the SGT mapping of the first data packet at the control plane; transmitting, the first data packet directly from the first border of the first site to the second border of the second site without attaching the first SGT mapping associated with the first data packet while the first data packet is being transmitted; and in response to a determination by the control plane that the first data packet has reached the second border, identifying by the control plane the SGT mapping associated with the first data packet at the second border of the second site to enable the first SGT mapping to be re-associated with the first data packet at the second site.

Clause 2. The method of clause 1, further comprising: subscribing at the second border, by the control plane, a second SGT mapping associated with a second data packet at a second site for storing the second SGT mapping of the second data packet at the control plane; transmitting, second data packet directly from the second border of the second site to the first border of the first site without attaching the SGT mapping associated with the second data packet while the second data packet is being transmitted; and in response to a determination by the control plane that the second data packet has reached the first border, identifying by the control plane the second SGT mapping associated with the second data packet at the first border of the first site to enable the second SGT mapping to be re-associated with the second data packet at the first site.

Clause 3. The method of clause 1, further comprising: registering, by a first edge device, at a local mapping system of the first site to send to the first border, the first SGT mapping associated with the first data packet.

Clause 4. The method of clause 3, further comprising: learning, by control plane via the local mapping system at the first border of the first site, entries at a database of the local mapping system for the registering of the first SGT mapping associated with the first packet data; and uploading, at the border by the control plane, the first SGT mapping associated with the packet data to a network SGT mapping system of the control plane for propagating the first SGT mapping to one or more edge devices at the second site.

Clause 5. The method of clause 3, further comprising: applying a conversational learning process to determine whether to continue to preserve an entry for the first SGT mapping in the local mapping system at the second site or the first site based on data packet usage at either site.

Clause 6. The method of clause 5, wherein the conversation learning process comprises a Least Recently Used (LRU) mechanism that is implemented during a period when packet data flow has ceased in order to enable identifying of SGT mappings at either site for removal.

Clause 7. The method of clause 1, further comprising: evicting the first SGT mapping from at least one of the first border or the second border when the SGT mappings are learned by the control plane to be no longer required for propagating of policies associated with the first data packet.

Clause 8. The method of clause 1, further comprising: analyzing at least the first packet data transmitted between the first border and the second border by the control plane to determine whether to initiate an SGT resolution process to enable subscribers at either border to determine an SGT mapping with an unknown address associated with the first data packet.

Clause 9. The method of clause 1, further comprising: providing an update to a subscriber at either the first border or the second border based on SGT mapping updates at a local mapping server of either the first site or the second site.

Clause 10. A system comprising: one or more processors; and one or more non-transitory computer-readable media storing computer-executable instructions that, when executed by the one or more processors, cause the one or more processors to perform operations comprising: operatively coupling a control plane to a first border at a first site and to a second border at a second site; operatively coupling the first border of the first site to the second border of the second site; subscribing at the first border of the first site, by the control plane, a first security group tag (SGT) mapping associated with a first data packet at the first site for storing the SGT mapping of the first data packet at the control plane; transmitting, the first data packet directly from the first border of the first site to the second border of the second site without attaching the first SGT mapping associated with the first data packet while the first data packet is being transmitted; and in response to a determination by the control plane that the first data packet has reached the second border, identifying by the control plane the SGT mapping associated with the first data packet at the second border of the second site to enable the first SGT mapping to be re-associated with the first data packet at the second site.

Clause 11. The system of clause 10, the operations further comprising: subscribing at the second border, by the control plane, a second SGT mapping associated with a second data packet at a second site for storing the second SGT mapping of the second data packet at the control plane; and transmitting, second data packet directly from the second border of the second site to the first border of the first site without attaching the SGT mapping associated with the second data packet while the second data packet is being transmitted; and in response to a determination by the control plane that the second data packet has reached the first border, identifying by the control plane the second SGT mapping associated with the second data packet at the first border of the first site to enable the second SGT mapping to be re-associated with the second data packet at the first site.

Clause 12. The system of clause 10, the operations further comprising: registering, by a first edge device, at a local mapping system of the first site to send to the first border, the first SGT mapping associated with the first packet data.

Clause 13. The system of clause 12, the operations further comprising: learning, by control plane via the local mapping system at the first border of the first site, entries at a database of the local mapping system for the registering of the first SGT mapping associated with the first packet data; and uploading, at the border by the control plane, the first SGT mapping associated with the packet data to a network SGT mapping system of the control plane for propagating the first SGT mapping to one or more edge devices at the second site.

Clause 14. The system of clause 13, the operations further comprising: applying a conversational learning process to determine whether to continue to preserve an entry for the first SGT mapping in the local mapping system at the second site or the first site based on data packet usage at either site.

Clause 15. The system of clause 14, wherein the conversation learning process comprises a Least Recently Used (LRU) mechanism that is implemented during a period when packet data flow has ceased in order to enable identifying of SGT mappings at either site for removal.

Clause 16. The system of clause 10, the operations further comprising: evicting the first SGT mapping from at least one of the first border or the second border when the SGT mappings are learned by the control plane to be no longer required for propagating of policies associated with the first data packet.

Clause 17. The system of clause 10, the operations further comprising: analyzing at least the first packet data transmitted between the first border and the second border by the control plane to determine whether to initiate an SGT resolution process to enable subscribers at either border to determine an SGT mapping with an unknown address associated with the first data packet.

Clause 18. The system of clause 10, the operations further comprising: providing an update to a subscriber at either the first border or the second border based on SGT mapping updates at a local mapping server of either the first site or the second site.

Clause 19. One or more non-transitory computer-readable media storing computer-executable instructions that, when executed by one or more processors, cause the one or more processors to perform operations comprising: subscribing at a first border of a first site, by a control plane, a first security group tag (SGT) mapping associated with a first data packet at the first site for storing the SGT mapping of the first data packet at the control plane; transmitting, the first data packet directly from the first border of the first site to a second border of the second site without attaching the first SGT mapping associated with the first data packet while the first data packet is being transmitted; and in response to a determination by the control plane that the associated first SGT mapping is lost at the second border, identifying by the control plane the SGT mapping associated with the first data packet at the second border to enable the first SGT mapping to be re-associated with the first data packet at the second site.

Clause 20. The non-transitory computer-readable media of clause 19, the operations further comprising: subscribing at the second border, by the control plane, a second SGT mapping associated with a second data packet at a second site for storing the second SGT mapping of the second data packet at the control plane; and transmitting, second data packet directly from the second border of the second site to the first border of the first site without attaching the SGT mapping associated with the second data packet while the second data packet is being transmitted; and in response to a determination by the control plane that the second SGT mapping associated with the second data packet is lost at the first border, identifying by the control plane the second SGT mapping associated with the second data packet at the first border of the first site to enable the second SGT mapping to be re-associated with the second data packet at the first site.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:

operatively coupling a control plane to a first border at a first site and to a second border at a second site;

operatively coupling the first border of the first site to the second border of the second site;

receiving, at the control plane and from the first border of the first site, first security group tag (SGT) mappings indicating first associations between first Internet Protocol (IP) addresses and first SGTs at the first site;

storing, at storage associated with the control plane, the first SGT mappings;

transmitting a first data packet directly from the first border of the first site across a third-party network and to the second border of the second site without attaching a particular SGT mapping of the first SGT mappings associated with the first data packet, wherein the third-party network is configured to strip SGT mappings associated with data packets;

receiving, at the control plane, a request from the second border for an SGT mapping associated with the first packet;

in response to the request, identifying, by the control plane and from the first SGT mappings in the storage, the particular SGT mapping associated with the first data packet; and sending the particular SGT mapping to the second border of the second site to enable the particular SGT mapping to be re-associated with the first data packet at the second site.

2. The method of claim 1, further comprising:

receiving, from the second border and by the control plane, a second SGT mapping associated with a second data packet at the second site, the second SGT mapping being stored at the control plane;

transmitting the second data packet directly from the second border of the second site to the first border of the first site without attaching the SGT mapping associated with the second data packet while the second data packet is being transmitted; and in response to a determination by the control plane that the second data packet has reached the first border, identifying by the control plane the second SGT mapping associated with the second data packet at the first border of the first site to enable the second SGT mapping to be re-associated with the second data packet at the first site.

3. The method of claim 1, further comprising:

registering, by a first edge device, at a local mapping system of the first site to send to the first border, the first SGT mappings.

4. The method of claim 3, further comprising:

learning, by control plane via the local mapping system at the first border of the first site, entries at a database of the local mapping system for the registering of the first SGT mapping associated with the first packet data; and uploading, at the border by the control plane, the first SGT mappings to a network SGT mapping system of the control plane for propagating the first SGT mappings to one or more edge devices at the second site.

5. The method of claim 3, further comprising:

applying a conversational learning process to determine whether to continue to preserve an entry for the first SGT mappings in the local mapping system at the second site or the first site based on data packet usage at either site.

6. The method of claim 5, wherein the conversation learning process comprises a Least Recently Used (LRU) mechanism that is implemented during a period when packet data flow has ceased in order to enable identifying of SGT mappings at either site for removal.

7. The method of claim 1, further comprising:

evicting the first SGT mappings from at least one of the first border or the second border when the first SGT mappings are learned by the control plane to be no longer required for propagating of policies associated with the first data packet.

8. The method of claim 1, further comprising:

analyzing at least the first packet data transmitted between the first border and the second border by the control plane to determine whether to initiate an SGT resolution process to enable subscribers at either border to determine an SGT mapping with an unknown address associated with the first data packet.

9. The method of claim 1, further comprising:

providing an update to a subscriber at either the first border or the second border based on SGT mapping updates at a local mapping server of either the first site or the second site.

10. A system comprising:

one or more processors; and one or more non-transitory computer-readable media storing computer-executable instructions that, when executed by the one or more processors, cause the one or more processors to perform operations comprising:

operatively coupling a control plane to a first border at a first site and to a second border at a second site;

operatively coupling the first border of the first site to the second border of the second site;

receiving, at the control plane and from the first border of the first site, first security group tag (SGT) mappings indicating first associations between first Internet Protocol (IP) addresses and first SGTs at the first site;

storing, at storage associated with the control plane, the first SGT mappings;

transmitting a first data packet directly from the first border of the first site across a third-party network and to the second border of the second site without attaching a particular SGT mapping of the first SGT mappings associated with the first data packet, wherein the third-party network is configured to strip SGT mappings associated with data packets;

receiving, at the control plane, a request from the second border for an SGT mapping associated with the first packet;

in response to the request, identifying, by the control plane and from the first SGT mappings in the storage, the particular SGT mapping associated with the first data packet; and sending the particular SGT mapping to the second border of the second site to enable the particular SGT mapping to be re-associated with the first data packet at the second site.

11. The system of claim 10, the operations further comprising:

receiving, from the second border and by the control plane, a second SGT mapping associated with a second data packet at the second site, the second SGT mapping being stored at the control plane;

transmitting the second data packet directly from the second border of the second site to the first border of the first site without attaching the SGT mapping associated with the second data packet while the second data packet is being transmitted; and in response to a determination by the control plane that the second data packet has reached the first border, identifying by the control plane the second SGT mapping associated with the second data packet at the first border of the first site to enable the second SGT mapping to be re-associated with the second data packet at the first site.

12. The system of claim 10, the operations further comprising:

registering, by a first edge device, at a local mapping system of the first site to send to the first border, the first SGT mappings.

13. The system of claim 12, the operations further comprising:

learning, by control plane via the local mapping system at the first border of the first site, entries at a database of the local mapping system for the registering of the first SGT mapping associated with the first packet data; and uploading, at the border by the control plane, the first SGT mappings to a network SGT mapping system of the control plane for propagating the first SGT mappings to one or more edge devices at the second site.

14. The system of claim 13, the operations further comprising:

applying a conversational learning process to determine whether to continue to preserve an entry for the first SGT mappings in the local mapping system at the second site or the first site based on data packet usage at either site.

15. The system of claim 14, wherein the conversation learning process comprises a Least Recently Used (LRU) mechanism that is implemented during a period when packet data flow has ceased in order to enable identifying of SGT mappings at either site for removal.

16. The system of claim 10, the operations further comprising:

evicting the first SGT mappings from at least one of the first border or the second border when the first SGT mappings are learned by the control plane to be no longer required for propagating of policies associated with the first data packet.

17. The system of claim 10, the operations further comprising:

analyzing at least the first packet data transmitted between the first border and the second border by the control plane to determine whether to initiate an SGT resolution process to enable subscribers at either border to determine an SGT mapping with an unknown address associated with the first data packet.

18. The system of claim 10, the operations further comprising:

providing an update to a subscriber at either the first border or the second border based on SGT mapping updates at a local mapping server of either the first site or the second site.

19. One or more non-transitory computer-readable media storing computer-executable instructions that, when executed by one or more processors, cause the one or more processors to perform operations comprising:

receiving, at a control plane and from a first border of a first site, first security group tag (SGT) mappings indicating first associations between first Internet Protocol (IP) addresses and first SGTs at the first site;

storing, at storage associated with the control plane, the first SGT mappings;

transmitting a first data packet directly from the first border of the first site across a third-party network and to a second border of a second site without attaching a particular SGT mapping of the first SGT mappings associated with the first data packet, wherein the third-party network is configured to strip SGT mappings associated with data packets;

receiving, at the control plane, a request from the second border for an SGT mapping associated with the first packet;

in response to the request, identifying, by the control plane and from the first SGT mappings in the storage, the particular SGT mapping associated with the first data packet; and sending the particular SGT mapping to the second border of the second site to enable the particular SGT mapping to be re-associated with the first data packet at the second site.

20. The non-transitory computer-readable media of claim 19, the operations further comprising:

subscribing at the second border, by the control plane, a second SGT mapping associated with a second data packet at a second site for storing the second SGT mapping of the second data packet at the control plane; and transmitting, second data packet directly from the second border of the second site to the first border of the first site without attaching the SGT mapping associated with the second data packet while the second data packet is being transmitted; and in response to a determination by the control plane that the second SGT mapping associated with the second data packet is lost at the first border, identifying by the control plane the second SGT mapping associated with the second data packet at the first border of the first site to enable the second SGT mapping to be re-associated with the second data packet at the first site.

* * * * *